Patented Oct. 25, 1932

1,883,952

UNITED STATES PATENT OFFICE

EMIL KLARMANN, OF JERSEY CITY, AND LOUIS W. GATYAS, OF BLOOMFIELD, NEW JERSEY, ASSIGNORS TO LEHN & FINK, INC., OF BLOOMFIELD, NEW JERSEY, A CORPORATION OF NEW YORK

HYDROQUINONE DERIVATIVE

No Drawing.   Application filed August 17, 1931. Serial No. 557,730.

The present invention relates to hydroquinone derivatives, and more particularly to mono-ethers of hydroquinone having high bactericidal efficiency. Hydroquinone, although a phenolic body, is very low in bactericidal efficiency, being distinctly weaker than phenol in this respect. For example, its phenol coefficient with respect to *Staphylococcus aureus* is substantially below 0.5

We have, however, produced various ethers of hydroquinone having a high bactericidal efficiency, in general, at least 3.5 and for the most part in excess of 10 times that of phenol with respect to *B. typhosus* at 37° C. and more than 10 times that of phenol with respect to *Staph. aureus* at the same temperature.

The compounds of hydroquinone which we have produced and found to have high bactericidal efficiency are the mono-ethers of hydroquinone in which the substituting ether radical is of the general formula—$C_2H_4.R$ wherein R is an alkyl or aryl radical.

The hydroquinone mono-ethers of the present invention may, in general, be produced by condensing hydroquinone with a halogen derivative of the substituting ether radical in the presence of alkali, either in aqueous, alcoholic or mixed solution and either with or without an organic solvent; or the hydroquinone may be condensed with a halogen derivative of the substituting ether radical in the presence or absence of an organic solvent without the presence of alkali. The resulting mono-ether may be purified in any desired manner; for example, by steam distillation in the presence of an excess of alkali to effect removal of diethers, followed by acidification and steam distillation to remove the mono-ether; or the mono-ether may be extracted from the reaction mixture by washing with aqueous solutions of alkali, acidification and steam or vacuum distillation or crystallization. Or, if it is desired to form the mono-ether without producing the diether, para-nitro-phenol may be condensed with a halogen derivative of the substituting ether radical in the presence of alkali, the resulting nitro-ether separated, reduced to the corresponding amino compound, diazotized and converted to the corresponding hydroxy compound by the methods ordinarily used.

The following example illustrates the production of mono-iso-propyl ether of hydroquinone.

37 grams of hydroquinone is dissolved in 40 cc. of alcohol, and 56.7 grams of isopropyl iodide are added to the solution. The mixture is heated under a reflux condenser, a solution of 20 grams of potassium hydroxide in 60 cc. of water being slowly added and the boiling then continued until conversion is complete. Unconverted isopropyl iodide and the di-iso-propyl ether of hydroquinone are removed from the resulting mixture by steam distillation by addition of alkali. The remaining solution is then acidified with hydrochloric acid and again steam distilled, the desired hydroquinone mono-iso-propyl ether being thereby removed. It is isolated from the distillate by extraction with ether and, after evaporation of the latter, is purified by repeated distillation in vacuo.

The general method employed may also be utilized for the production of other mono-ethers in accordance with the present invention, the corresponding equivalent proportions of the halogen derivative of the substituting ether radical being employed. In the case of the mono-ethers higher than the propyl and isopropyl ethers, for example, the mono-butyl and higher ethers, it is found desirable to effect the separation of the mono-ether from the reaction mixture containing the di-ether by extracting the reaction mixture with an aqueous solution of alkali, such as potassium or sodium hydroxide, thereby removing the mono-ether, acidifying the resulting solution of the mono-ether, and separating the mono-ether by steam distillation, extraction with the solvent such as ether, or the like. Further purification of the higher mono-ethers, which are solid, crystalline bodies, may be readily effected by crystallization from water or ligroin.

As hereinbefore pointed out, the mono-ethers of the present invention may also be produced by condensing hydroquinone directly with the halides of the substituting hydrocarbon radicals or in the presence of high boiling solvents, such as xylene.

The following tabulation indicates the marked bactericidal properties of the new hydroquinone mono-ethers of the present invention, their particular effectiveness in action against *Staph. aureus* being of a highly unusual character. It has been found that their effectiveness against streptococci is in general on a par with their effectiveness as against *Staph. aureus*.

Table No. I

| Hydroquinone mono-ether | B. Typhosus phenol coefficient | Staphylococcus aureus phenol coefficient |
|---|---|---|
| n-propyl | 5.4 | 4.1 |
| iso-propyl | 3.6 | 2.3 |
| n-butyl | 14 | 9.3 |
| n-amyl | 29 | 30 |
| iso-amyl | 19 | 24 |
| n-hexyl | 13 | 100 |
| n-heptyl | 17 | 205 |
| n-octyl | | 365 |
| phenyl ethyl | 25 | 29 |
| phenyl propyl | 10 | 13 |

The mono-iso-propyl ether is a substantially colorless oil, having a boiling point of 117° C. at 4 mm. pressure. The monophenylethyl ether of hydroquinone is likewise an oil, having a boiling point of 182–184° C. at 4 mm. pressure. The higher mono-ethers are in general, white, crystalline bodies, their melting points being as shown in the following table:

Table No. II

| | Melting point |
|---|---|
| Hydroquinone mono-n-propyl ether | 56–57° C. |
| Hydroquinone mono-n-butyl ether | 64–65° |
| Hydroquinone mono-n-amyl ether | 49–50° |
| Hydroquinone mono-iso-amyl ether | 48–49° |
| Hydroquinone mono-n-hexyl ether | 48° |
| Hydroquinone mono-n-heptyl ether | 60° |
| Hydroquinone mono-n-octyl ether | 60–61° |
| Hydroquinone mono-n-nonyl ether | 68.5° |
| Hydroquinone mono-n-phenyl propyl ether | 75.76° |

It is readily apparent that the substituting ether radical, which has at least 3 carbon atoms, may contain various substituting groups without departing from the scope of the present invention.

We claim:

1. As a composition of matter, a hydroquinone mono-ether having the formula p-OH-$C_6H_4$.O.$C_2H_4$.R, wherein R is an alkyl or aryl radical, said ether having a high bactericidal efficiency.

2. A hydroquinone mono-ether in which the substituting ether radical is an alkyl radical having at least 3 carbon atoms, said ether having a high bactericidal efficiency.

3. A hydroquinone mono-ether in which the substituting ether radical is an aryl-substituted ethyl group, said ether having a high bactericidal efficiency.

4. Hydroquinone mono-phenylethyl ether.

5. Hydroquinone mono-hexylether.

6. Hydroquinone mono-heptylether.

EMIL KLARMANN.
LOUIS W. GATYAS.